United States Patent [19]
Hattori et al.

[11] Patent Number: 4,567,089
[45] Date of Patent: Jan. 28, 1986

[54] THERMOFORMING PROPYLENE POLYMER LAMINATED SHEET

[75] Inventors: Satoru Hattori; Takao Yazaki; Kazuhide Hattori; Koji Nishida; Hideki Hattori; Kazumasa Fujimura, all of Mie, Japan

[73] Assignee: Mitsubishi Petrochemical Co., Ltd., Tokyo, Japan

[21] Appl. No.: 633,458

[22] Filed: Jul. 23, 1984

[51] Int. Cl.[4] .................................................. B32B 7/02
[52] U.S. Cl. ...................................... 428/213; 428/35; 428/500; 428/516
[58] Field of Search ............... 428/516, 35, 500, 213; 524/584

[56] References Cited

U.S. PATENT DOCUMENTS

| | | | |
|---|---|---|---|
| 3,773,741 | 11/1973 | Berta | 524/584 |
| 4,120,844 | 10/1978 | Meyer et al. | 524/584 |
| 4,339,496 | 7/1982 | Weiner | 428/516 |
| 4,384,024 | 5/1983 | Mitchell et al. | 428/516 |
| 4,414,261 | 11/1983 | Nanbu | 428/516 |

Primary Examiner—Edith Buffalow
Attorney, Agent, or Firm—Oblon, Fisher, Spivak, McClelland & Maier

[57] ABSTRACT

A propylene polymer laminated sheet is described, comprising at least two layers wherein at least one surface layer is Layer A comprising 95% by weight or more of a specific crystalline propylene polymer and up to 5% by weight of an inorganic or organic nucleating agent, the thickness of Layer A being from 0.5 to 45% of the total thickness of the sheet, and at least one other layer is Layer B comprising from 40 to 95 parts by weight of a resin component and from 60 to 5 parts by weight of an inorganic filler, the resin component comprising from 5 to 85% by weight of a specific crystalline propylene polymer and from 95 to 15% by weight of an ethylene polymer, the thickness of Layer B being from 55 to 99.5% of the total thickness of the sheet. This sheet has excellent deep drawing properties and can produce a product having excellent surface gloss, appearance and impact resistance.

19 Claims, No Drawings

THERMOFORMING PROPYLENE POLYMER LAMINATED SHEET

FIELD OF THE INVENTION

The present invention relates to a thermoforming propylene polymer laminated sheet. More particularly, it is concerned with a thermoforming propylene polymer laminated sheet which can be deeply drawn by vacuum or pressure forming and provide a product having excellent surface gloss, appearance and impact resistance.

BACKGROUND OF THE INVENTION

Sheets of crystalline polyolefins such as polypropylene and polyethylene have excellent mechanical and thermal properties and sanitariness. Thus, those sheets have been widely used in fabrication of food trays, food containers, industrial mechanical parts, car parts, and so forth as substitutes for conventional sheets of polystyrene, an acrylonitrile/butadiene/styrene copolymer, polyvinyl chloride, and the like.

With extension of the range of use of such crystalline polyolefin sheets, various improvements have been made in the composition thereof for the purpose of greatly improving deep drawing properties at the time of vacuum or pressure forming. Typical improvements are described in, for example, Japanese Patent Application (OPI) Nos. 108433/80 and 142810/83 (the term "OPI" as used herein means a "published unexamined Japanese patent application").

A composition comprising a specific type of polyethylene and a specific type of polypropylene is used in Japanese Patent Application (OPI) No. 108433/1980, and a composition comprising specific types of polypropylene and polyethylene and a specific amount of a styrene polymer is used in Japanese Patent Application (OPI) No. 142810/1983. The use of these compositions broadens the molding temperature range of sheets and also permits a higher extent of deep drawing and production of product having reduced irregularities in thickness.

Products produced by vacuum or pressure forming the compositions, however, have several disadvantages. One of the disadvantages is that the gloss of the products is poor. In producing sheets, the compositions are contact cooled on a mirror surface roll to maintain, the roll surface state and as a result, sheets having excellent gloss can be obtained. These sheets, however, are remelted at a preheating step for vacuum or pressure forming and are allowed to crystallize in a free surface state at a cooling step after the deep drawing, resulting in deterioration of the gloss thereof. Thus, those sheets are unsuitable for use in applications where the gloss is required.

Another disadvantage is that when inorganic fillers are compounded to the compositions so as to increase their heat resistance, stiffness and dimensional stability, the impact resistance of the resulting compositions is seriously reduced and sheets produced therefrom are unsuitable for practical use.

SUMMARY OF THE INVENTION

The object of the present invention is to provide a sheet which can be deeply drawn and provide a product having uniform thickness, excellent gloss and excellent impact resistance.

The above object can be attained with a multilayer laminated structure wherein each layer comprises specific components.

The present invention provides a thermoforming propylene polymer laminated sheet comprising at least two layers, wherein at least one surface layer is Layer A as described hereinafter, the thickness of Layer A being from 0.5 to 45% of the total thickness of the sheet, and at least one other layer is Layer B as described hereinafter, the thickness of Layer B being from 55 to 99.5% of the total thickness of the sheet.

Layer A: A layer comprising from 100 to 95% by weight of a crystalline propylene polymer having a melt flow rate of from 1 to 8 g/10 min., a propylene content of 95% by weight or more and a Q value of 3.5 or more, and from 0 to 5% by weight of an inorganic or organic nucleating agent.

Layer B: A layer of a composition having a melt flow rate of 2 g/10 min. or less comprising from 40 to 95 parts by weight of a resin component and from 60 to 5 parts by weight of an inorganic filler, wherein the resin component comprises from 5 to 85% by weight of a crystalline propylene polymer having a Q value of 8 or more and from 95 to 15% by weight of an ethylene polymer having a Q value of 9 or less.

DETAILED DESCRIPTION OF THE INVENTION

Layer A will be explained in detail below.

The crystalline propylene polymer which constitute Layer A is a polymer having the melt flow rate (MFR) as determined according to JIS-K 6758 (230° C., 2.16 kg) of from 1 to 8 g/10 min., preferably from 2 to 6 g/10 min., the propylene content of 95% by weight or more, preferably 98% by weight or more, and the Q value of 3.5 or more, preferably from 4 to 11. Suitable examples of the crystalline propylene polymers include a propylene homopolymer, and a block or random copolymer of propylene and ethylene or an α-olefin having from 4 to 20 carbon atoms, preferably from 4 to 12 carbon atoms, more preferably from 4 to 8 carbon atoms. Particularly preferred examples thereof are a propylene homopolymer and a propylene random copolymer. The crystalline propylene polymer may contain comonomers other than the α-olefin, such as unsaturated organic acids or their derivatives, vinyl esters and vinyl silanes, within a range which does not deteriorate the gloss. In this case, such comonomers are usually incorporated in the form of graft copolymers or random copolymers.

If MFR of the crystalline propylene polymer exceeds 8 g/10 min., problems may arise in that the degree of sagging of the sheet by preheating at the vacuum forming step is increased and the unevenness in the thickness of the vacuum formed product is increased. Furthermore, the regenerated product, when used in Layer B as described above, increases MFR of Layer B and further causes problems as described hereinafter. On the other hand, if MFR is less than 2 g/10 min., the gloss is undesirably low.

If the propylene content in the crystalline propylene polymer is less than 95% by weight, the gloss of the product is remarkedly low.

If the Q value (a ratio of a weight average molecular weight to a number average molecular weight) is less than 3.5, the impact resistance and gloss of the product are not satisfactory.

Two or more of the above-described crystalline propylene polymers may be used in combination with each other.

In Layer A, if necessary, the inorganic or organic nucleating agent is added to the crystalline propylene polymer. Suitable examples of the inorganic or organic nucleating agent include non-fibrous inorganic powders such as calcium carbonate, silica, talc, clay, titanium oxide or barium sulfate; aliphatic or aromatic dicarboxylic acids or their anhydrides; aromatic monocarboxylic acids and their metal salts; amine salts or metal salts of aliphatic dicarboxylic acids; aluminum salts of aromatic acids; and diarylphosphate alkali metal salts. Particularly useful examples are talc having a particle size of $20\mu$ or less, aluminum salts of aromatic acids, and diaryl phosphate alkali metal salts.

It is preferred that the organic or inorganic nucleating agent be added. The amount of the nucleating agent added is 5% by weight or less, preferably 2% by weight or less, based on the total weight of the crystalline propylene polymer and the nucleating agent. Addition of the nucleating agent improves the heat resistance, stiffness, scratch resistance, dimensional stability and gloss of the product. Even if the nucleating agent is added in an amount of more than 5% by weight, no additional affect can be expected and conversely the gloss deteriorates.

As described above, Layer A has an excellent gloss and can be effectively used as a surface layer in the laminated sheet of the present invention.

Layer B will be explained in detail below.

The composition which constitutes Layer B is a specific blend comprising a crystalline propylene polymer, an ethylene polymer and an inorganic filler. The crystalline propylene polymer which can be used has a Q value of 8 or more, preferably from 8.5 to 12. Suitable examples thereof are a propylene homopolymer and a random or block copolymer of propylene and ethylene or an α-olefin having from 4 to 20 carbon atoms, preferably from 4 to 12 carbon atoms, more preferably from 4 to 8 carbon atoms. The crystalline propylene polymer may contain comonomers other than the α-olefin, such as unsaturated organic acids or their derivatives, vinyl esters and vinyl silanes, within a range that does not deteriorate the deep drawing properties.

Two or more of the crystalline propylene polymers may be used in combination with each other. However, the propylene content must be 50% by weight or more. In view of the stiffness and heat resistance of the product, the propylene content is preferably 65% by weight or more, more preferably 80% by weight or more. MFR, as determined according to JIS-K 6758 (230° C., 2.16 kg), of the crystalline propylene polymer is preferably 5 g/10 min. or less from the standpoint of moldability.

If the Q value of the crystalline propylene polymer is less than 8, the impact resistance of the product becomes insufficient.

The ethylene polymer which is another constituent of the composition has a Q value of 9 or less, preferably 4 to 8. Suitable examples thereof are an ethylene homopolymer and a copolymer of ethylene and α-olefin having from 3 to 20 carbon atoms, preferably from 3 to 12 carbon atoms, more preferably from 3 to 8 carbon atoms, and the ethylene content therein is 50% by weight or more.

An ethylene homopolymer and a copolymer of ethylene and α-olefin, having the ethylene content of 70% by weight or more, are preferred from a standpoint of stiffness and heat resistance. Particularly preferred examples are those having a density of 0.925 g/cm$^3$ or more.

Two or more of the ethylene polymers may be used in combination with each other. MFR of the ethylene copolymers as determined according to JIS-K 6760 (190° C., 2.16 kg) is preferably 3 g/10 min. or less, more preferably 2 g/10 min. or less from the standpoint of moldability.

If the Q value of the ethylene polymer exceeds 9, the impact resistance of the product becomes insufficient.

The other constituent of the composition is an inorganic filler. Suitable examples of the inorganic filler include calcium carbonate, silica, talc, clay, mica, titanium oxide, barium sulfate, glass fiber and carbon fiber. Particularly preferred examples thereof are talc, calcium carbonate and mica in view of the fact that kneadability, stiffness and deep drawing properties are well balanced.

To prepare the composition of Layer B, the above-described crystalline propylene polymer, ethylene polymer and inorganic filler are blended so as to obtain a composition comprising from 40 to 95 parts by weight of a resin component and from 60 to 5 parts by weight of the inorganic filler, preferably from 55 to 85 parts by weight of the resin component and from 45 to 15 parts by weight of the inorganic filler (total 100 parts by weight), the resin component comprising from 5 to 85% by weight of the crystalline propylene polymer and 95 to 15% by weight of the ethylene polymer, preferably from 10 to 70% by weight of the crystalline propylene polymer and from 90 to 30% by weight of the ethylene polymer.

MFR, as determined according to JIS-K 6758 (230° C., 2.16 kg), of the composition is 2 g/10 min. or less, preferably 1.5 g/10 min. or less.

If the amount of the crystalline propylene polymer in the composition is less than 5% by weight, that is, the amount of the ethylene polymer exceeds 95% by weight, the degree of sagging of the sheet at a preheating step for vacuum forming increases. This gives rise to a problem that in order to avoid the contact of the sheet with a heater placed therebelow in a molding machine, the time for which molding is possible is substantially shortened. On the other hand, if the amount of the crystalline propylene polymer exceeds 85% by weight, that is, the amount of the ethylene polymer is less than 15% by weight, deep drawing properties are remarkedly deteriorated and unevenness in the thickness of the product occurs.

If the amount of the inorganic filler compounded exceeds 60 parts by weight, deep drawing properties are deteriorated. On the other hand, if the amount thereof is less than 5 parts by weight, the heat resistance, stiffness and dimensional stability of the product become insufficient.

If MFR of the composition exceeds 2 g/10 min., sagging of the sheet occurs and deep drawing properties are deteriorated.

The compositions for use in preparing Layers A and B can be prepared by conventional kneading techniques by using a kneader such as an extruder, a roll or a Banbury mixer. In general, the composition is kneaded, pelletized and then molded into a sheet. It is also possible that after dry blending, for example, of the constituents, the resulting composition is molded directly into a sheet.

To the compositions for Layers A and B, if desired, additives such as antioxidants, ultraviolet absorbers, antioxidants, lubricants, dispersants, clarifiers, colorants, and anti-corrosion agents can be added depending on the purpose of use of the product.

The laminated sheet of the present invention can be produced by conventional lamination methods. For example, a coextrusion method using, for example, a multi-manifold or a feed block; a method in which Layer A is first produced in a film or sheet form by the use of a T die or an inflation die and then Layer B or a laminate including Layer B as at least one layer is extruded on Layer A in a molten state and bonded thereto; a method in which Layer B or a laminate including Layer B as at least one layer is first produced by the use of a T die and then Layer A is extruded on Layer B in a molten state and bonded thereto; and a method in which Layer B or a laminate including Layer B as at least one layer and Layer A are produced separately and they are then bonded together with an adhesive or through an adhesive layer of, e.g., an adhesive molten resin, can be employed.

In the laminated sheet of the present invention, at least one surface layer must be Layer A and at least one of the other layers must be Layer B. Further, the thickness of Layer A must constitute from 0.5 to 45%, preferably from 1 to 30%, of the total thickness of the laminated sheet, and the thickness of Layer B must constitute from 55 to 99.5%, preferably from 70 to 99%, of the total thickness.

The important elements of the laminated sheet of the present invention are a surface layer having excellent gloss and a layer containing inorganic fillers and having a deep drawing function. Thus, the gloss and deep drawing properties are influenced by the ratio of the thickness of each layer to the total thickness of the laminated sheet.

If the thickness of Layer A is less than the lower limit of the above-specified range, the gloss remarkably drops. On the other hand, if the thickness is more than the upper limit, the deep drawing performance is deteriorated. If the thickness of Layer B is less than the lower limit of the above-specified range, the deep drawing performance is deteriorated, whereas if the thickness is more than the upper limit, a sufficient thickness cannot be obtained for the gloss layer.

Thermoforming includes vacuum forming, pressure forming, solid pressure forming, solid press forming, and stamping forming.

The laminated sheet of the present invention has excellent gloss and deep drawing properties and can find numerous applications.

The specific crystalline propylene polymer (optionally containing inorganic fillers) for use in the surface layer, when molded into a sheet by itself, is very inferior in the deep drawing performance. Nevertheless, unexpectedly, when the crystalline propylene polymer is used in preparing the laminated sheet of the present invention, such does not deteriorate the deep drawing properties of the other layers.

The present invention is described in greater detail by reference to the following Examples and Comparative Examples.

Evaluation methods are as follows:

(1) Deep Drawing Properties

An about 1.5 mm thick single or multi layer sheet is sandwiched between two plates (250 mm×250 mm×3 mm) with a hole of diameter 150 mm bored in the center thereof, and then placed horizontally in an insulated box. In the case of the multi layer sheet, the top layer is Layer A.

In order to uniformly heat the sheet, a heater maintained at 450° C. is moved over the sheet at a height of 15 cm.

The heated sheet expands first toward the heater. Then, as the temperature rises uniformly in the direction of thickness of the sheet, the sheet again becomes horizontal. Thereafter, the sheet begins to sag under the action of the weight thereof.

In this testing, a number of sheet specimens are tested. The time required until the first specimen becomes horizontal is measured. For the other specimens, the heater is removed at intervals of ±5 seconds, ±10 seconds, ±15 seconds and so on with the time for the first specimen as a base.

A force plug with a top (R: 40 mm; diameter: 80 mm) on which a felt is wound is forced onto the specimens to a depth of 150 mm under conditions of forcing speed 240 mm/sec. and load 1.0 kg/cm$^2$. The drawing ratio is 1.0.

After cooling, the force plug is removed, and the resulting mold is examined for unevenness in thickness by passing light therethrough or by the use of a dial gauge.

According to the above-described procedure, the drawing ratio and unevenness in thickness of the mold at each preheating time are examined, and a preheating time is determined at which a mold with a drawing ratio of 1.0 and uniform in thickness can be obtained.

The longer the preheating time when the uniformity in thickness can be obtained, the broader the temperature range where molding is possible. This means that the sheet has good moldability.

(2) Gloss

Of U-shaped molds which have been tested for deep drawing properties, one having the most uniform thickness distribution is chosen. A ⅓ portion of the upper part of the mold is cut off and measured for gloss. If there are many molds having a uniform thickness distribution, the average is taken.

The gloss is determined according to JIS-Z 8741 at an angle of 60°—60°.

(3) Degree of Sagging

The depth to which the central portion of the sheet sags when the sheet is preheated for 4 minutes is measured as a degree of sagging by the use of an apparatus for evaluation of deep drawing properties.

(4) Modulus

Three point bending modulus as determined according to JIS-K 7203.

(5) Impact Strength

Izod impact strength as determined according to JIS-K 7110.

EXAMPLES 1 TO 9 AND COMPARATIVE
EXAMPLES 1 TO 12

Constituents for the composition of Layer B as shown in Table 1 were compounded, extruded into strand and then pelletized. In Comparative Example 4 only, extruding was not applied. These pellets were fed to a 700 mm wide two-layer multi-manifold die at 200° to 270° C. using an extruder.

A crystalline propylene polymer for Layer A as shown in Table 1 was fed to the same die as above at 230° to 270° C. using an extruder.

A molten sheet extruded from the die was successively cooled and solidifed on three rolls (width: 700 mm). The die temperature was 230°-240° C., the temperature of the rolls were set at 80° C., 95° C. and 100° C. in the order of the distance from the die, and the rotary speed of the rolls was 1.5 m/min.

The total thickness of the sheet was 1.6 mm. The thicknesses of Layers A and B, and evaluation results of the sheet are shown in Table 2.

TABLE 1

| | | Crystalline Propylene Polymer for Layer A | | | | Composition for Layer B | | | | | | | |
|---|---|---|---|---|---|---|---|---|---|---|---|---|---|
| | | | | | | Crystalline Propylene Polymer | | | | High Density Polyethylene*1 | | | Talc*2 |
| Example No. | Comparative Example No. | Type | C₃ Content (wt. %) | MFR (g/10 min) | Q Value | MFR (g/10 min) | Type | C₃ Content (wt %) | MFR (g/10 min) | Q Value | Amount (parts by weight) | MFR (g/10 min) | Q Value | Amount (parts by weight) | Amount (parts by weight) |
| 1 | | Homo-polymer | 100 | 2.0 | 4.5 | 0.30 | Block polymer | 95 | 0.5 | 10 | 40 | 0.6 | 5 | 40 | 20 |
| 2 | | Block polymer | 97 | 0.5 | 10 | " | " | " | " | " | " | " | " | " | " |
| 3 | | Random polymer | 98 | 1.6 | 5 | " | " | " | " | " | " | " | " | " | " |
| | 1 | Block polymer | 92 | 0.5 | 12 | " | " | " | " | " | " | " | " | " | " |
| | 2 | Homo-polymer | 100 | 6.5 | 3 | " | " | " | " | " | " | " | " | " | " |
| | 3 | — | — | — | — | " | " | " | " | " | " | " | " | " | " |
| | 4 | — | — | — | — | 0.40 | " | " | " | " | 100 | — | — | — | " |
| 4 | | Homo-polymer | 100 | 2.0 | 4.5 | " | " | " | " | " | 66.4 | 0.6 | 5 | 13.6 | " |
| 5 | | Homo-polymer | " | " | " | 0.35 | " | " | " | " | 32 | " | " | 48 | " |
| 6 | | Homo-polymer | " | " | " | 0.40 | " | " | " | " | 5.6 | " | " | 74.4 | " |
| | 5 | Homo-polymer | " | " | " | 0.50 | " | " | " | " | 70.4 | " | " | 9.6 | " |
| | 6 | Homo-polymer | " | " | " | 0.52 | " | " | " | " | 2.4 | " | " | 77.6 | " |
| 7 | | Homo-polymer | " | " | " | 1.50 | " | " | 4.5 | 11 | 40 | 2.5 | 6 | 40 | " |
| | 7 | Homo-polymer | " | " | " | 3.50 | " | " | 6.0 | " | " | 5.0 | " | " | " |
| | 8 | Homo-polymer | " | " | " | 0.20 | " | " | 0.5 | 10 | " | 0.1 | 11 | " | " |
| | 9 | Homo-polymer | " | " | " | 0.80 | Homo-polymer | 100 | 1.8 | 6 | " | 0.6 | 5 | " | " |
| 8 | | Homo-polymer | " | " | " | 0.30 | Block polymer | 95 | 0.5 | 10 | " | " | " | " | " |
| | 10 | Homo-polymer | " | " | " | " | Block polymer | " | " | " | " | " | " | " | " |
| | 11 | Homo-polymer | " | " | " | " | Block polymer | " | " | " | " | " | " | " | " |
| 9 | | Homo-polymer | " | " | 6 | " | Block polymer | " | " | " | " | " | " | " | " |
| | 12 | Homo-polymer | " | 10 | " | " | Block polymer | " | " | " | " | " | " | " | " |

Note:
*1 Density: 0.950 g/cm³
*2 Average particle size: 4μ

TABLE 2

| Example No. | Comparative Example No. | Proportion of Layer in Total Thickness (%) Layer A | Proportion of Layer in Total Thickness (%) Layer B | Gloss (%) | Deep Drawing Properties (Sec.) | Degree of Sagging (mm) | Impact Resistance (kg · cm/cm) |
|---|---|---|---|---|---|---|---|
| 1 | | 16 | 84 | 80 | 15 | 5 | 6 |
| 2 | | " | " | 70 | " | " | 8 |
| 3 | | " | " | 75 | " | " | 6.5 |
| | 1 | " | " | 20 | " | " | 10 |
| | 2 | " | " | 50 | 20 | 7 | 3.5 |
| | 3 | 0 | 100 | 5 | " | 6 | 11 |
| | 4 | " | " | 10 | 5 | 20 | 3 |
| 4 | | 16 | 84 | 80 | 10 | 4 | 5 |
| 5 | | " | " | " | 15 | 6 | 8 |
| 6 | | " | " | 75 | 20 | 10 | 10 |
| | 5 | " | " | 78 | 5 | 6 | 3.5 |
| | 6 | " | " | 75 | 15 | 25 | 11 |
| 7 | | " | " | 77 | " | 10 | 5 |
| | 7 | " | " | 75 | 5 | 24 | 3 |
| | 8 | " | " | " | 15 | 3 | " |
| | 9 | " | " | " | 10 | 10 | 2.5 |
| 8 | | 6 | 94 | 78 | 15 | 5 | 7 |
| | 10 | 50 | 50 | 82 | 5 | 15 | 4 |
| | 11 | 0.4 | 99.6 | 30 | 15 | 5 | 8 |
| 9 | | 16 | 84 | 78 | " | 10 | 6 |
| | 12 | " | " | 50 | 10 | 15 | " |

EXAMPLE 10

The procedure of Example 1 was repeated except that 0.3% by weight of talc having an average particle size of 4μ was added to the resin for Layer A.

EXAMPLE 11

The procedure of Example 10 was repeated except that the talc was replaced by an aluminum salt of p-tert-butyl-benzoic acid.

COMPARATIVE EXAMPLE 13

The procedure of Example 10 was repeated wherein the amount of talc added was changed from 0.3% by weight to 8% by weight.

EXAMPLE 12 AND COMPARATIVE EXAMPLE 14

The procedure of Example 1 was repeated except that talc or calcium carbonate was added to the resin for Layer B in an amount as shown in Table 3.

For comparison, the sheet of Example 1 was also measured for bending modulus.

The results obtained are shown in Table 4.

TABLE 3

| Example No. | Comparative Example No. | Additive Amount (wt %) | Composition for Layer A Crystalline Propylene Polymer Type | C₃ Content (wt %) | MFR (g/10 min) | Q Value | Composition for Layer B Crystalline Propylene Polymer MFR (g/10 min) | Type | C₃ Content (wt %) | MFR (g/10 min) | Q Value |
|---|---|---|---|---|---|---|---|---|---|---|---|
| 1 | | — | Homo-polymer | 100 | 2.0 | 4.5 | 0.30 | Block polymer | 95 | 0.5 | 10 |
| 10 | | 0.3* | Homo-polymer | " | " | " | " | Block polymer | " | " | " |
| 11 | | 0.3** | Homo-polymer | " | " | " | " | Block polymer | " | " | " |
| | 13 | 8* | Homo-polymer | " | " | " | " | Block polymer | " | " | " |
| 12 | | — | Homo-polymer | " | " | " | 0.20 | Block polymer | " | " | " |
| | 14 | — | Homo-polymer | " | " | " | 0.15 | Block polymer | " | " | " |

| Example No. | Comparative Example No. | Composition for layer B Amount (parts by weight) | MFR (g/10 min) | Q Value | High Density Polyethylene Amount (parts by weight) | Filler Type | Filler Amount |
|---|---|---|---|---|---|---|---|
| 1 | | 40 | 0.6 | 5 | 40 | Talc | 20 |
| 10 | | " | " | " | " | " | " |
| 11 | | " | " | " | " | " | " |
| | 13 | " | " | " | " | " | " |
| 12 | | 25 | " | " | 25 | CaCO₃ | 50 |
| | 14 | 15 | " | " | 15 | " | 70 |

Note:
*Talc
**Aluminum-p-tert-butylbenzoate

TABLE 4

| Example No. | Comparative Example No. | Proportion of Layer in Total Thickness (%) | | Gloss (%) | Evaluation Results | | |
| --- | --- | --- | --- | --- | --- | --- | --- |
| | | Layer A | Layer B | | Deep Drawing Properties (sec) | Degree of Sagging (mm) | Impact Resistance (kg · cm/cm) |
| 1 | | 16 | 84 | 80 | 15 | 5 | 23,000 |
| 10 | | " | " | 83 | " | " | " |
| 11 | | " | " | 85 | " | " | 23,500 |
| | 13 | " | " | 40 | " | " | 24,000 |
| 12 | | " | " | 70 | " | 10 | 32,000 |
| | 14 | " | " | " | 10 | 25 | 36,000 |

What is claimed is:

1. A thermoforming propylene polymer laminated sheet consisting essentially of:
   at least two layers, at least one of which is a surface layer A having a thickness of from 0.5 to 45% of the total thickness of the sheet, and wherein at least one other layer is layer B having a thickness of from 55 to 99.5% of the total thickness of the sheet, said layer A comprising from 100 to 95% by weight of a crystalline propylene polymer having a melt flow rate of from 1 to 8 g/10 min, a propylene content of at least 95% by weight and a Q value of at least 3.5 and from 0 to 5% by weight of an inorganic or organic nucleating agent, and said layer B being of a composition having a melt flow rate of no more than 2 g/10 min and comprising from 40 to 95 parts by weight of a resin component and from 60 to 5 parts by weight of an inorganic filler, said resin component comprising from 5 to 85% by weight of a crystalline propylene polymer having a Q value of at least 8 and from 95 to 15% by weight of an ethylene polymer having a Q value of no more than 9.

2. The thermoforming polymer laminated sheet as claimed in claim 1, wherein the crystalline propylene polymer in Layer A has the melt flow rate of from 2 to 6 g/min., propylene content of at least 98% by weight and a Q value of from 4 to 11.

3. The thermoforming polymer laminated sheet as claimed in claim 1, wherein the crystalline propylene polymer in Layer A is a propylene homopolymer or a random copolymer.

4. The thermoforming polymer laminated sheet as claimed in claim 1, wherein the nucleating agent is selected from the group consisting of talc having a particle size of 20μ or less, aluminum salts of aromatic acids and diarylphosphate alkali metal salts.

5. The thermoforming polymer laminated sheet as claimed in claim 1, wherein the amount of the nucleating agent is no more than 2% by weight.

6. The thermoforming polymer laminated sheet as claimed in claim 1, wherein the crystalline propylene polymer in Layer B has a Q value of from 8.5 to 12.

7. The thermoforming polymer laminated sheet as claimed in claim 1, wherein the propylene content in the crystalline propylene polymer of Layer B is at least 65% by weight.

8. The thermoforming polymer laminated sheet as claimed in claim 7, wherein the propylene content is at least 80% by weight.

9. The thermoforming polymer laminated layer as claimed in claim 1, wherein the crystalline propylene polymer in Layer B has a melt flow rate of no more than 5 g/10 min.

10. The thermoforming polymer laminated sheet as claimed in claim 1, wherein the ethylene polymer has a Q value of from 4 to 8.

11. The thermoforming polymer laminated sheet as claimed in claim 1, wherein the ethylene polymer is an ethylene homopolymer or a copolymer of ethylene and α-olefin having an ethylene content of at least 70% of weight.

12. The thermoforming polymer laminated sheet as claimed in claim 1, wherein the ethylene polymer has a density of at least 0.925 g/cm$^3$.

13. The thermoforming polymer laminated sheet as claimed in claim 1, wherein the ethylene polymer has a melt flow rate of no more than 3 g/10 min.

14. The thermoforming polymer laminated sheet as claimed in claim 13, wherein the melt flow rate is no more than 2 g/10 min.

15. The thermoforming polymer laminated sheet as claimed in claim 1, wherein the inorganic filler is selected from the group consisting of talc, calcium carbonate and mica.

16. The thermoforming polymer laminated sheet as claimed in claim 1, wherein the resin component comprises from 10 to 70% by weight of the crystalline propylene polymer and from 30 to 90% by weight of the ethylene polymer.

17. The thermoforming polymer laminated sheet as claimed in claim 1, wherein the composition of Layer B comprises from 55 to 85 parts by weight of the resin component and from 15 to 45 parts by weight of the inorganic filler.

18. The thermoforming polymer laminated sheet as claimed in claim 1, wherein the composition of Layer B has a melt flow rate of no more than 1.5 g/10 min.

19. The thermoforming polymer laminated sheet as claimed in claim 1, wherein the thickness of Layer A is 1 to 30% and the thickness of Layer B is 70 to 99%.

* * * * *